United States Patent [19]
Feichtiger et al.

[11] Patent Number: 5,251,568
[45] Date of Patent: Oct. 12, 1993

[54] ACTUATING DRIVE FOR INSTALLATION IN A BODY OF A MOTOR VEHICLE

[75] Inventors: Dieter Feichtiger, Aidlingen; Josef Schumacher, Reutlingen; Tobias Reis, Wildberg; Klaus-Jürgen Heimbrodt; Georg Klink, both of Treuchtlingen, all of Fed. Rep. of Germany

[73] Assignees: Mercedes-Benz AG; Walter Alfmeier GmbH, both of Fed. Rep. of Germany

[21] Appl. No.: 802,287

[22] Filed: Dec. 4, 1991

[30] Foreign Application Priority Data

Dec. 4, 1990 [DE] Fed. Rep. of Germany ....... 4038550

[51] Int. Cl.$^5$ .................. G09F 17/00; B60Q 9/00
[52] U.S. Cl. .................. 116/28 R; 116/272; 116/283
[58] Field of Search .............. 116/28 R, 209, 270, 116/272, 281, 283

[56] References Cited

U.S. PATENT DOCUMENTS

| | | | |
|---|---|---|---|
| 2,620,763 | 12/1952 | Smith et al. | 116/209 X |
| 3,117,549 | 1/1964 | Ripepe | 116/28 R |
| 3,439,326 | 4/1969 | Boudin | 116/28 R X |
| 3,678,456 | 7/1972 | Gruber | 116/28 R X |
| 4,755,791 | 7/1988 | Kuroda | 340/115 |
| 4,945,818 | 8/1990 | Ware | 116/283 X |
| 4,962,720 | 10/1990 | Leffel | 116/173 |
| 4,977,849 | 12/1990 | Brinton | 116/28 R |

FOREIGN PATENT DOCUMENTS

| | | |
|---|---|---|
| 213253 | 6/1960 | Austria . |
| 1755279 | 1/1972 | Fed. Rep. of Germany . |
| 3042801 | 6/1982 | Fed. Rep. of Germany . |
| 3504466 | 3/1986 | Fed. Rep. of Germany . |
| 3738688 | 5/1988 | Fed. Rep. of Germany . |
| 3814009 | 9/1989 | Fed. Rep. of Germany . |

Primary Examiner—William A. Cuchlinski, Jr.
Assistant Examiner—W. Morris Worth
Attorney, Agent, or Firm—Evenson, McKeown, Edwards & Lenahan

[57] ABSTRACT

An actuating drive for installation in a body of a motor vehicle, from whose housing an actuator guided therein can be retracted and extended through an exit opening. A mount is provided for attaching the housing to the body with the exit opening of the attached housing being supported at the edge on an edge of a body opening that can likewise be penetrated by the actuator. According to the invention, the housing is guided so as to be displaceable with respect to the mount to and fro along a displacement axis in the direction of movement of the actuator. A clamping device is provided for displacing the housing with respect to the mount along the displacement axis, by means of which the housing, which is supported on one side at least indirectly on the mount, can be clamped on the other side against the edge of the body opening.

18 Claims, 3 Drawing Sheets

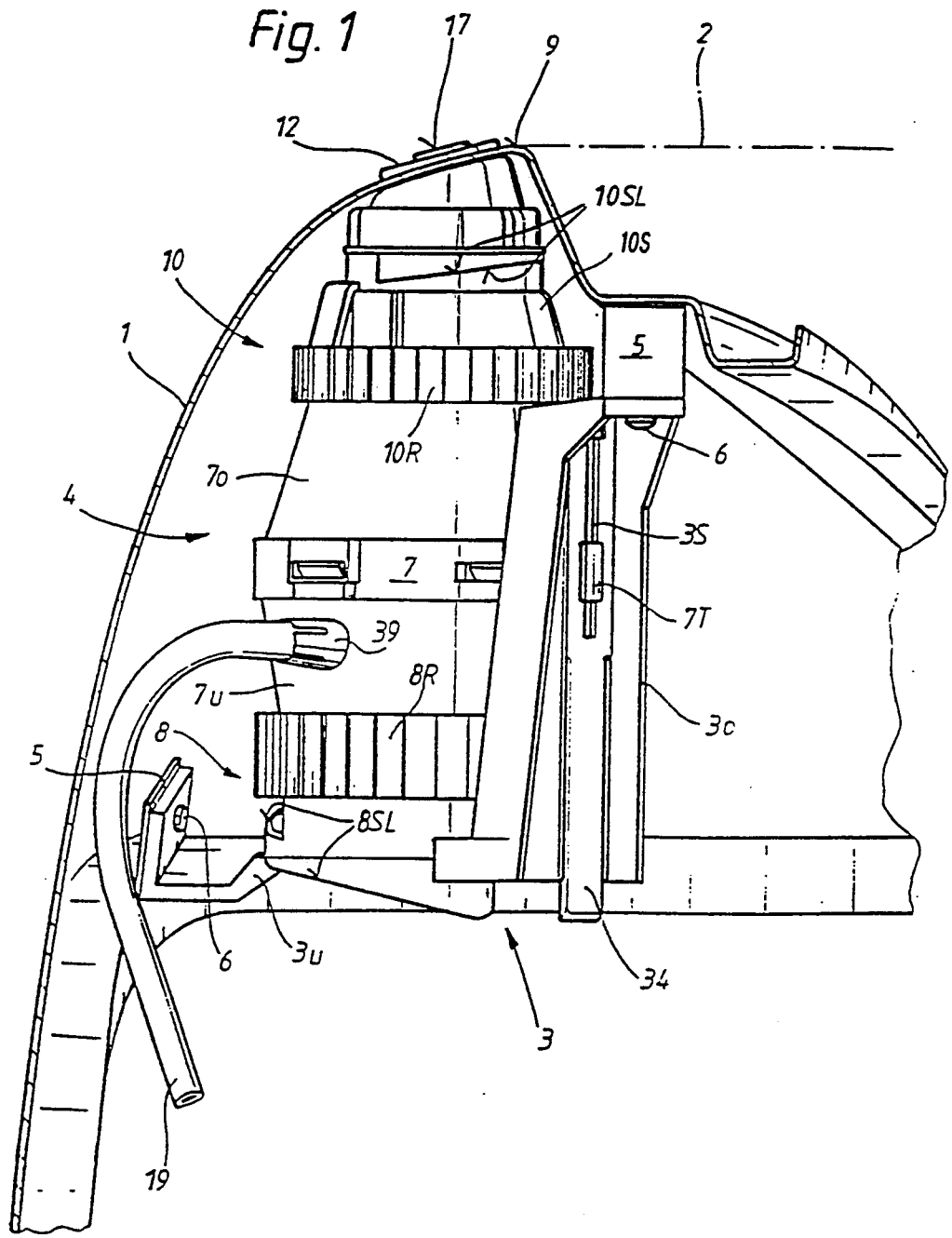

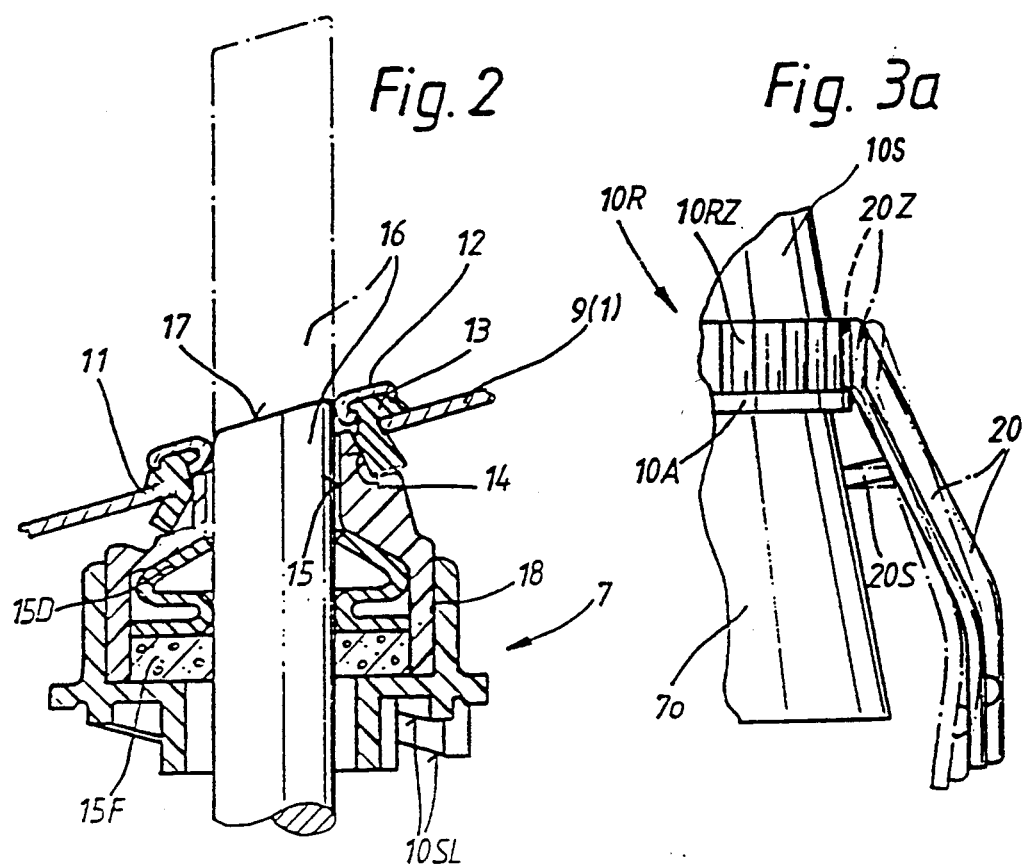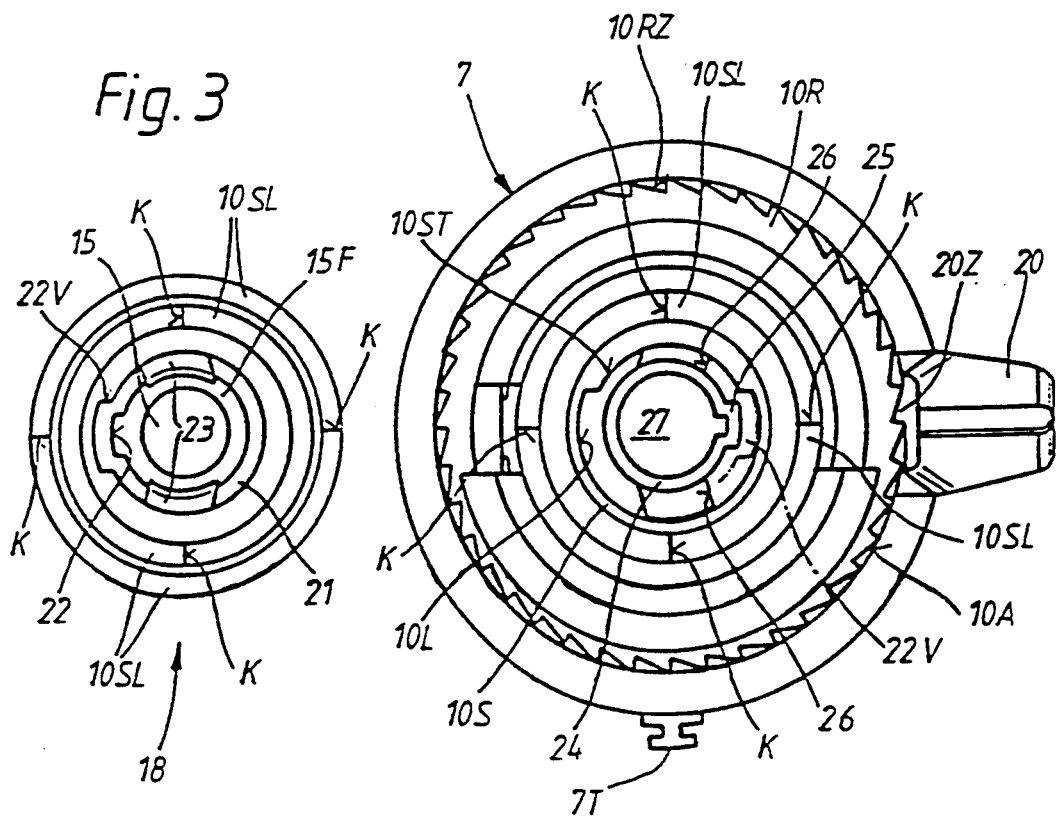

ACTUATING DRIVE FOR INSTALLATION IN A BODY OF A MOTOR VEHICLE

BACKGROUND AND SUMMARY OF THE INVENTION

The invention relates to an actuating drive for installation in a body of a motor vehicle for actuating a sighting rod or the like to be movable between a stowed position and an in use position. An actuating drive of this general type is known from German Patent Document DE 3,814,009 C1.

Although the above mentioned publication outlines, in relation to a body wall or body opening, the installation position of the actuating drive whose actuator serves directly as a sighting rod providing a visual orientation aid when parking or in similar driving situations, nothing is expressed concerning the precise attachment of the actuating drive housing to the vehicle body, in particular there is no mention of how the free end of the actuator can be aligned with respect to the edge of the body opening which is penetrates. It is merely to be implicitly assumed that the actuating drive has a mount for its housing.

It is also impossible to gather from another relevant publication, German Patent Document DE 3,042,801 A1 any device for aligning the free end of the actuator during assembly in the body. All that is represented there is a rigid mount of the drive on a carrier fixed in the body. The free end of the actuator is provided with a radially projecting head which is drawn against sunk edges of a body opening during retraction. The rest position of the free end is precisely determined thereby.

Austrian Patent Document AT-PS 213,253 describes a parking aid for motor vehicles which has a feeler that can be extended rearwards from the body. This feeler is held in its retracted rest position by a mechanical retainer which must be overcome by the actuating rive of the feeler in order to extend it.

An adjusting device for an electrical switch is known (brake light switch HONDA CB 400 N), which via a setting nut supports a receiving sleeve provided with an external thread for the switch in a rigid mount. The switching point of the switch can be set steplessly by rotating the setting nut with respect to the receiving sleeve guided rotationally looked in the mount.

It is an object of the invention to provide an actuating drive of the above-noted type and, in particular, an attachment possibility that is suitable for restricted installation conditions and easy to manipulate for the purpose of compensating tolerance-induced dimensional variations of the body.

This object is achieved according to preferred embodiments of the invention by an arrangement wherein there is provided a housing with an exit opening, an actuator, which is guided in the housing and can be retracted and extended by penetrating the exit opening, and a mount for attaching the housing to the body, the exit opening of the attached housing being supported at the edge on an edge of a body opening that can likewise be penetrated by the actuator, and wherein said housing is supported on one side at least indirectly on the mount and is guided to be displaceable with respect to said mount to and fro along a displacement axis in the direction of movement of the actuator, wherein a clamping device is provided by means of which an outer contour projecting from the housing on another side of an edge of the exit opening of the housing can be clamped against an inner side of the opening of the body.

The housing of the actuating drive can be clamped by means of a clamping device between the mount and an (upper) cover of the interior of the body component, the housing being centered in the body opening penetrated by the actuator. The required easy installation of the entire actuating drive in an extremely restricted body space, in particular in a mudguard cavity, is achieved when the actuating drive together with its mount—into which it can simply be clipped—is inserted into the tight installation space, whereupon firstly the mount is attached to the body and then the actuating drive is clamped against the body opening by means of the clamping device.

Such an arrangement is not limited merely to use of the actuator of the actuating drive as an extendable orientation aid, but can also be used, for example, in conjunction with a tank flap locking element—in which it is known that the actuator of a central locking control element can be guided directly as a latch through a cover plate of the tank flap (German Patent Document DE 3,504,466 C1).

Specifically with regard to use of the actuating drive within the scope of an orientation aid, it is possible firstly to use an adjusting device to align the edge of the exit opening of the housing of the actuating drive with the free end of the actuator before installation of the actuating drive in the vehicle body, or to align the free end of the actuator exactly with the corresponding opening in the body component after completed assembly, in order to achieve, in a simple fashion which facilitates assembly, a stylistically perfect, smooth surface in the region of said body opening. The edge of the exit opening is preferably conical and centers the housing in the opening when the clamping device is operated.

It is advantageous for the clamping device and the adjusting device to be designed as self-locking; a stepwise adjustment by means of retainers which can be canceled for the purpose of disassembly provides a particularly favorable assembly. Reworking is also avoided in this way. Furthermore, by pretensioning the actuating drive, thermal expansions and mechanical stresses occurring during driving are automatically compensated.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic view of the actuating drive installation positioned in a partially represented motor vehicle body component, constructed according to a preferred embodiment of the invention;

FIG. 2 shows a sectional representation of the component and the actuating drive corresponding to FIG. 1 in the region of an opening for guiding an actuator therethrough;

FIG. 3 shows a representation of an adjusting device provided on the housing of the actuating drive for adjusting its length;

FIG. 3a shows a detail of the adjusting device according to FIG. 3; and

DETAILED DESCRIPTION OF THE DRAWINGS

Figure 4:
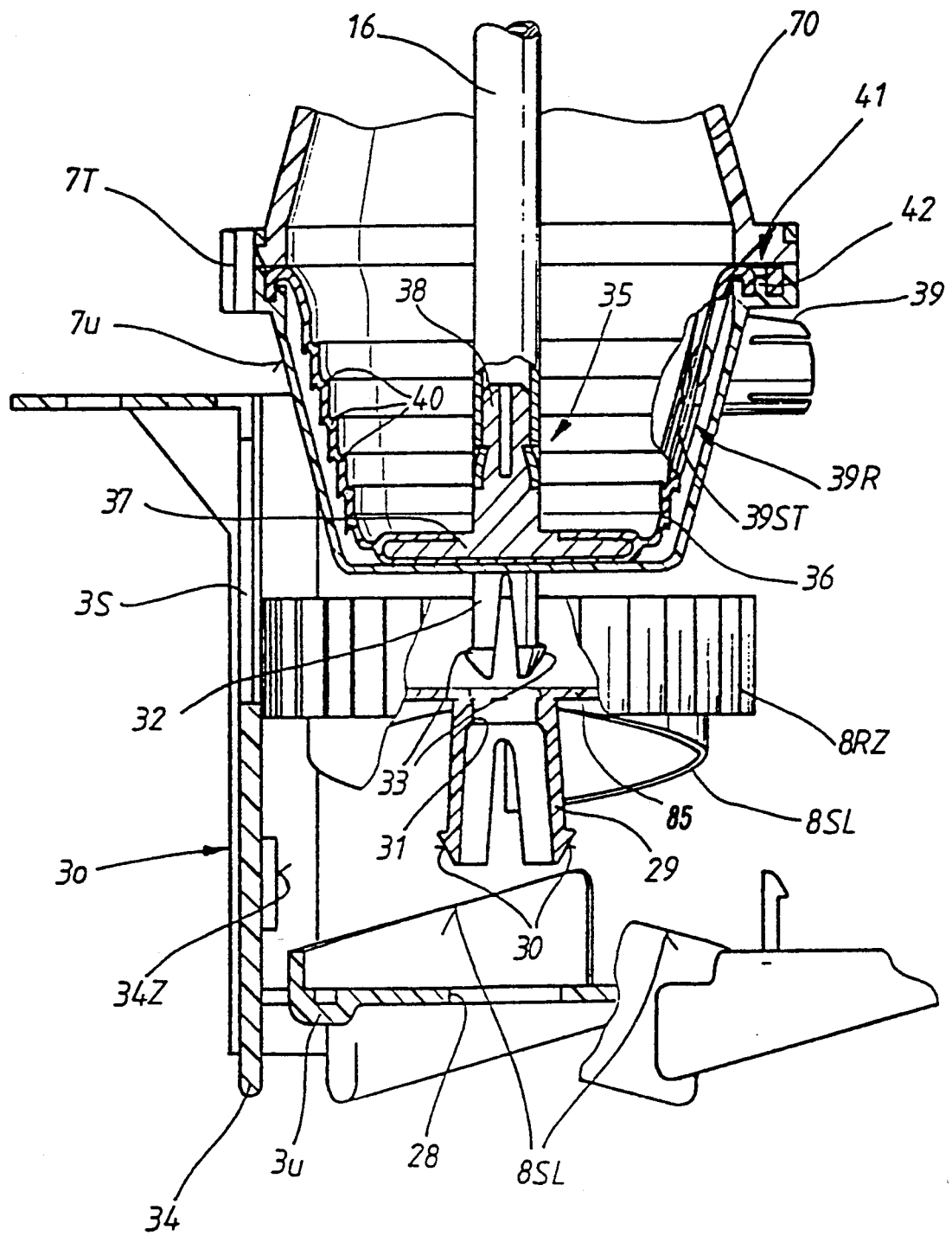
FIG. 4 shows an exploded representation of a clamping device for adjusting the housing, represented partially sectioned, of the actuating drive operated by means of a pneumatic diaphragm piston with respect to its mount, and for clamping it in the installation position shown in FIG. 1.

According to FIG. 1, a mount 3 for an actuating drive 4 is attached by means of screws 6 to two cover plates 5 fixed at an interior side of a component of a body 2 of a motor vehicle (not shown in more detail)—for example in a corner region of a rear mudguard. The actuating drive 4 has a housing 7 with an upper housing part 7o and a lower housing part 7u which is guided in the mount 3 rotationally locked and capable of displacement longitudinally—in the vertical direction in the drawing. The mount 3 is essentially L-shaped, having a lower, horizontally arranged limb 3u and an upper, vertically arranged limb 3o. Formed in the upper limb 3o is a longitudinal slot 3S, which is opened upwards, and into which an attachment 7T, of T-shaped cross-section, of the housing 7 can be axially inserted from above and is guided slidingly therein and is capable of being displaced. This pairing of longitudinal slot and attachment produces the rotational lock of the housing 7 with respect to the mount 3. Moreover, a further locking lever 34, the aim of which will be explained later, is integrally formed on the upper limb 3o of the mount 3. The entire housing 7 can be raised or lowered with respect to the mount 3 and thus also with respect to the component 1 in a linear fashion by means of a clamping device 8. During raising, the housing 7, which is supported on one side on the lower limb 3u of the mount 3, is clamped against an upper cover 9 of the interior of the component 1. This produces overall a three-point support of the actuating drive that is optimum from static and dynamic viewpoints. Also provided on the housing 7 is an adjusting device 10 by means of which the length of the housing 7 can be adjusted.

The clamping device 8 and the adjusting device 10, which will be further described in more detail later in connection with their mode of operation, are designed as self-locking in such a way that—when helices 8SL or 10SL which slide on one another are used—automatic adjustment under the loading of the clamping force or by vibrations of the body is excluded. An adjusting ring 8R or 10R that can be rotated by hand is allocated to them in each case.

As is shown even more clearly from the sectional representation in FIG. 2, there is provided in the upper cover 9 of the component 1, an opening 11 into which a ring 12 with a seal 13 is inserted. The top side of the ring 12 is located virtually flush with the outer side of the upper cover 9 of the component 1. The seal 13 serves, on the one hand, to seal the gap between the opening 11 and the ring 12 and, on the other hand, as an elastic bearing surface on the inside for a conically tapering edge 14 of an exit opening 15 of the housing 7. During the above mentioned clamping process and after its termination, the housing 7 is centered in the opening 11 or the inner circle of the seal 13 via the conical outer contour of the edge 14. This seal 13 is located with a lip on the top side of the component 1. In the plane of the opening 11, seal 13 has a small annular cavity which permits elastic yielding and resilient support of the edge 14 of the exit opening 15. By contrast, it bears directly against the underside of the upper cover of the component 1. The clamping force introduced by means of the clamping device 8 is applied between the mount 3 or the cover plate 5, on the one hand, and the seal 13 fixed in the opening 11 of the upper cover 9, or the ring 12, on the other hand. As a result, clamping is achieved and maintained both in the axial and in the radial direction.

An actuator 16 of the actuating drive 4 which has an upper free end 17 is guided outwards from the housing 7 through the exit opening 15. The actuator 16 is drawn in its retracted rest position, while its extended position is merely indicated by dots and dashes. The exit opening 15, in which a rubber sealing ring 15D with an inserted felt ring 15F embraces the actuator, is provided in an upper part 18 of the housing 7. The upper part 18 can be removed from the housing 7 and is guided rotationally locked on the latter and is capable of being displaced by means of the adjusting device 10 longitudinally—likewise in the vertical direction—(FIG. 3), the displacement of the upper part 18 causing a variation in the length of the housing 7. Using the adjusting device 10, it is possible for (i) the distance of the free end 17 of the actuator 16 from the edge 14 of the exit opening 15 to be preset—in the vertical direction -; and (ii) the position of the free end 17 in the opening 11 to be slightly readjusted further after the clamping of the actuating drive 4 between the mount 3 and opening 11. Thus, as required the clamping of the actuating drive 4 performed by means of the clamping device 8 can be either slightly increased or loosened by means of the adjusting device 10, in order to align the free end 17 with the top side of the ring 12.

The top sides of the ring 12, the edge 14 of the exit opening 15 and the free end 17 of the actuator 16 are evidently exactly matched to the contour of the body surface of the upper cover 9 of the component 1 in the region of the opening 11, so that in the rest position of the actuator 16 there is a virtually continuous smooth surface in the region of the opening 11, the production of which is simplified by the clamping device 8 or the adjusting device 10. It is therefore clear that the actuator 16 must be guided rotationally locked in the housing 7. As a preferred embodiment of the actuating drive 4, which is connected via a pneumatic connection 39 of the lower housing part 7u and a (hose) line 19 to a power source, use is made of a pneumatic drive known per se with a diaphragm piston clamped all round in the housing 7, which will be explained more precisely later. The rotationally locked guidance of the actuator 16 connected to the diaphragm piston is guaranteed in each case by said clamping. Since the upper part 18 of the housing 7 can be removed, the actuating drive can be used in a standardized fashion for different types of vehicles, it being necessary only for the upper parts—and possibly the actuators—to be held in store for specific types. The above mentioned felt ring 15F is impregnated with a sliding oil before installation of the upper part 18. The friction of the polished surface of the actuator 16 on the sealing ring 15D is negligibly small as a result, so that there is no need to apply any excessively high operating forces to extend and retract it. The selected arrangement is also advantageous where safety aspects are concerned, because the pneumatic dual-pressure drive is bistable and can therefore also be at zero pressure in the extended position of the actuator. The latter can therefore be pressed in again from the extended position without appreciable resistance if axial or obliquely directed forces act on it.

It may be remarked first of all concerning the function of the clamping device 8 and the adjusting device 10 that they both operate according to the same principle. The two adjusting rings 8R and 10R can, as mentioned, be rotated by hand, their axes of rotation being located in the longitudinal axis or movement axis of the actuator 16. The helices 8SL or 10SL cause a lifting movement of the upper part 18 or of the housing 7 in the case of rotation of the adjusting rings 8R or 10R.

It is true that the helices 8SL or 10SL do not rise very steeply, but since they slide in a very freely moving fashion it is necessary to provide additional selflocking. As has already been evident from FIG. 1, the two adjusting rings 8R or 10R are provided with external teeth 8RZ or 10RZ, which consist of saw teeth (compare FIGS. 3 and 3A). A ratchet device which normally allows rotation only in one direction at any one time is provided in each case for the two adjusting rings. In the case of the adjusting device 10, this rotation acts in the sense of inherently lengthening the housing 7, and in the case of the clamping device 8 in the sense of raising the housing 7 or the complete actuating drive 4 with respect to the mount 3 or the component 1. The ratchet devices thus embody selflocking of the clamping device 8 or of the adjusting device 10.

FIG. 3 shows the details of the adjusting device 10 in a top view of the actuating drive. The upper part 18 is removed here from the housing 7 and rotated by 180°, so that its underside is visible. The ratchet device, which is connected to the external teeth 10RZ of the adjusting ring 10R, is embodied by a two-armed locking lever 20, which is formed onto the housing 7 in one piece and whose upper free end engages with a complimentary saw tooth 20Z in the external teeth 10RZ. Upon clockwise rotation of the adjusting ring 10R, the oblique faces of the saw teeth of the external teeth 10RZ slide sequentially over the oblique face of the complementary saw tooth 20Z while a contrary rotation is prevented by abutment of the steep tooth flanks. The cross-section of the T-shaped attachment 7T of the housing 7 is also well in evidence here.

In FIG. 3a, which shows as a detail a side view of a part of the actuating drive 4 in the area in which the locking lever 20 is integrally formed, it is easier to see that the lower free end of the locking lever 20 can be pressed by hand in the direction towards the housing 7—position indicated by dots and dashes -, in order to disengage the complementary saw tooth 20Z from the external teeth, and to permit a contrary rotation of the adjusting ring 10R—in the sense of lowering the upper part 18—during manual operation of the locking lever 20. For this purpose, the one-piece connection of the locking lever 20 with the housing 7 is produced by a web 20S which is located nearer the upper free end of the locking lever 20. Moreover, it becomes clear in FIG. 3a that the complementary saw tooth 20Z of the locking lever 20 in engagement with the external teeth 10RZ further grips from behind an outer ring 10A of the adjusting ring 10R—whose diameter corresponds to the envelope of the external teeth 10R—and thus creates a simple axial lock—which can be lifted up—off the adjusting ring 10R on the housing 7.

It is further explained by FIG. 3 that a faceplate body 10S is connected in one piece to the adjusting ring 10R. The one-piece connection extends only over a part of the circumference of the adjusting ring. The helices 10SL already mentioned are arranged on two concentric circles of different radii—on the faceplate body 10S, on the one hand, and in a complementary fashion on the underside of the upper part 18, on the other hand. In particular, the helices 10SL each of the same radius extend in each case in pairs over half the circumference (that is to say 180°), and the pairs of helices of different radius are mutually offset by 90°. They are formed in each case by semicircular ramps which are integrally formed in one piece on the adjusting ring 10R or on the upper part 18. The ramp end stages are visible here as edges K. The ramp initial stages and end stages on the respective component are naturally at the same level in each case. Apart from the height adjustment of the upper part 18 on the housing 7, this arrangement also produces, during rotation of the adjusting ring 10R, an additional radial guidance owing to the ramps, whose top sides form the helices, because the latter are interleaved. Located centrally in the circles described by the helices 10SL, the faceplate body 10S has an approximately circular hole 10L whose radius is slightly shortened over a relatively small part of its circumference (approximately 60°) by a stepped contour 10ST. More detail will be given later concerning its purpose.

Furthermore, there is provided on the underside of the upper part 18 concentrically with respect to the semicircular ramps or helices 10SL a pipe socket 21, in which a groove 22 is formed and onto which two clip hooks 23 are formed in one piece. The pipe socket 21 forms a coaxial continuation of the exit opening 15—in which the felt ring 15F is also visible—into the interior of the housing 7. The two clip hooks 23 are arranged asymmetrically with respect to the circumference of the pipe socket 21. Since the wall thickness of the pipe socket 21 is small, a stepped enlargement of the radius 22V of the pipe socket is integrally formed in the region of the groove 22 over a relatively small circumferential angle.

In this small circumferential region 22V, the pipe socket 21 has approximately the same radius as the hole 10L in the faceplate body 10S on its larger circumferential part, while the radius of the preponderant part of the circumference of the pipe socket 21 corresponds approximately identically to the radius, shortened in the region of the stepped contour 10ST, of the hole 10L. In order to illustrate the purpose of this arrangement, a further small part of the pipe socket 21 is represented on the top side of the housing 7 with the mounted adjusting ring 10 R and faceplate 10S body in thin, dotted and dashed lines. The enlargement of the radius 22V of the pipe socket 21 in the region of the groove 22 evidently forms, in cooperation with the stepped contour 10ST on the faceplate body 10S of the adjusting ring 10R, the limitation of the possible angle of rotation of the adjusting ring 10R, the pipe socket 21 being inserted in the installed state into the hole 10L and the adjusting ring 10R being capable of rotation with respect to the upper part 18 in each case to the extent where a boundary of the stepped contour 10ST runs onto a boundary of the stepped enlargement of the radius 22V. The possible angle of rotation is advantageously dimensioned at approximately 180° such that although full utilization of the height adjustment is possible by means of the helices 10SL, jumping over from the highest point of the respective helix (the ramp end stage) into the lower-lying start of the following helix—by unnecessary further rotation of the adjusting ring 10R—is prevented. Further rotation in the opposite direction is prevented in any case by the abutment of the ramp end stages.

In conjunction with the groove 22, the clip hooks 23 form components of a position coding through an external shaping which permits only a specific attachment of the upper part 18 to the housing 7, and simultaneously represents a rotational lock and the axial guidance of the upper part 18. Corresponding components of this position coding on the top side of the upper housing part 7o are a pipe socket 24 with an integrally formed featherkey 25 and two recesses 26. The pipe socket 24 surrounds a through opening 27 in the housing 7 and forms a coaxial continuation outwards of said opening. The through opening 27 is aligned with the exit opening 15 when the housing 7, the adjusting ring 10R being attached to the upper part 18 is mounted. For this purpose, the clip hooks 23 are introduced into the recesses 26, and the featherkey 25 into the groove 22. The free end 17 of the actuator 16 simultaneously penetrates into the exit opening 15 (cf. FIG. 2). The clip hooks 23 Can grip the respective edge of the recess 26 in the interior of the housing 7 from behind, and prevent the upper part 18 from falling out of the housing 7.

In addition, during the assembly of the upper part 18 in relation to the adjusting ring 10R already mounted, according to FIG. 3a), on the housing 7 there is a further necessarily correct positioning of the groove 22 in the region of the larger circumference of the hole 10L. Thus, if the upper part 18 cannot be correctly mounted despite correct positioning of the groove 22 and of the clip hooks 23, it is firstly necessary for the adjusting ring mounted according to FIG. 3a) to be rotated such that the said groove can be inserted into the circumferential part of the hole 10L of larger radius. After the clip hooks 23 have been locked in the recesses 26, the upper part 18 and the adjusting ring 10R are securely attached to the housing 7, the adjusting ring 10R being attached to the upper housing part 7o only indirectly via the attaching means of the upper part 18. It goes without saying that the clip hooks are at least long enough so that the displacement of the upper part 18 during rotation of the adjusting ring 10R is not prevented, that is to say that their clip noses are correspondingly far removed from the visible end face of the pipe socket 21.

The exploded representation of the clamping device 8 according to FIG. 4 indicates that its adjusting ring 8R—represented partly cut away—is also connected in one piece to a faceplate body 8S which bears helices 8SL. The configuration of the helices 8SL corresponds fully to that of the helices 10SL of the adjusting device 10, that is to say two pairs, mutually offset by 90°, of semicircular ramps, which extend in each case over half the circumference of two concentric circles. Complementary helices 8SL are formed here in the lower limb 3u of the mount 3. However, in principle these could also be integrally formed on the underside of the housing 7. The lower limb 3u of the mount 3 has a hole 28 in the center of the circle described by the helices 8SL. A hollow pin 29, which is formed in one piece onto the faceplate body 8S of the adjusting ring 8R and whose shaft diameter corresponds to the diameter of the hole 28 can be inserted into this hole 28. The hollow pin 29 is longitudinally slotted and has at its free ends clip noses 30, which project in each case and whose external dimension is greater than the diameter of the hole 28, so that, after a temporary resilient deflection, they can grip the edge thereof from behind after the insertion of the hollow pin 29 into the hole 28, and secure the adjusting ring 8R loosely and rotatably on the mount 3. The adjusting ring 8R retains the ability to be moved by displacement with respect to the mount in the axial direction of the hollow pin 29, which ability is limited to a specific travel and is utilized to raise the adjusting ring 8R and the housing 7 during rotation of the adjusting ring. It is consequently at least as large as the projected maximum height of the helices 8SL.

The internal cavity of the hollow pin 29 continues through the plane of the faceplate body 8S, but its cross-section is constricted in this plane by a step 31. Likewise formed onto the closed underside of the lower housing part 7u of the actuating drive 4 is a longitudinally slotted hollow pin 32 with clip noses 33 at the end. Its external dimension at the shaft corresponds to the internal dimension, constricted by the step 31, of the hollow pin 29, while the external dimension measured over the clip noses 33 is slightly larger. The hollow pin 32 can thus be introduced axially into the interior of the hollow pin 29, its clip noses 33 being temporarily elastically deflected and gripping the step 31 from behind in the elastically restored installed state. Since the faceplate body 8S is smooth on its top side facing the housing 7, after the insertion of the hollow pin 32 of the housing into the hollow pin 29 of the faceplate body the adjusting ring 8R can be freely rotated with respect to the housing 7, which is likewise smooth on the underside apart from the hollow pin 31, it being the case that here, too, the ability to be moved by displacement in the axial direction of the hollow pins 29 or 32, which is limited by the clip noses 33, is retained. It is not possible to insert the hollow pin 32 of the housing into the hollow pin 29 of the faceplate body from the wrong side and to lock it therein, because the latter hollow pin is longer than the first, and in this case the clip noses 33 do not reach the step 31, not to mention being able to grip it from behind. It is now possible for the adjusting ring 8R, and the housing 7 to be inserted, consecutively or else connected to one another in advance in the manner described, into the hole 28 of the lower limb of the mount, in order to assume therein the position shown in FIG. 1. The mount 3 and the housing 7 of the actuating drive form a unit in this preassembly state. In this assembly, the adjusting ring 8R is arranged between the lower limb 3u of the mount 3 and the lower housing part 7u such that the housing 7 is supported indirectly on one side on the mount 3 via the faceplate body 8S of the adjusting ring 8.

The locking lever 34, which is integrally formed in one piece on the upper limb 3o of the mount 3 and constructed rectilinearly, engages, in the same way as already described in conjunction with the locking lever 20 of the adjusting device 10, in the external teeth 8RZ of the adjusting ring 8R by means of one or two complementary saw teeth 34Z. In interaction with said ring, it likewise forms a self-locking, but releasable ratchet device. Here, the release is effected by withdrawing by hand the downwardly pointing free end of the locking lever 34 from the housing 7. In this process, the engagement of the complementary saw teeth 34Z in the external teeth 8RZ is canceled, so that the adjusting ring 8R can also be rotated in the opposite direction in order to cancel or release the clamping of the housing 7 against the upper cover 9. Care is to be taken with respect to the dimensioning of the complementary saw teeth 34Z that they remain in engagement with the external teeth 8RZ of the adjusting ring 8R over the entire limited travel of said ring (which corresponds at least to the maximum (projected) height of rise of the helices 8SL) that is possible during clamping of the housing. This aspect does not apply to the adjusting device 10, because in the case of the latter the adjusting ring 10R itself is not displaced.

The cross-section through the housing 7 of the actuating drive 4 exhibits a preferentially selected diaphragm piston 35 whose diaphragm 36 is clamped in a known way all round the edge between the upper housing part 7o and the lower housing part 7u. A working chamber 35K is therefore delimited between the diaphragm 36 and the inner wall of the lower housing part 7u. the pneumatic connection 39—which is continued outwards via the line 19—is evidently arranged in the lower part 7u such that the actuator 16 can be extended by applying overpressure of the diaphragm piston 35, and retracted once again by applying underpressure. Connected rigidly to the diaphragm 36 by injection molding is a piston plate 37 which in turn bears a central shaft attachment 38 on which the actuator 16 is mounted. A channel 39R, which has a web 39ST extending longitudinally therein and which proceeds from the pneumatic connection 39 towards the base of the housing part 7u, is formed in the inner wall of the lower housing part 7u. It is prevented by means of this configuration that the diaphragm 36 closes the connection 39, to which overpressure is applied, as soon as it rolls over it and that there would be no further rolling before it has reached its lower end position. It is true that the pneumatic connection 39 could also be integrated in principle into the hollow pin 32, so that in any event the air could be exhausted from the lower-most level of the working chamber or pumped into it. However, this possibility is not embodied because of the possible formation and induction of condensed water. Since the actuating drive has only one working chamber, the exit opening 15 need be sealed with the sealing ring 15D only against the ingress of water; pneumatic overpressure or underpressure does not occur there.

Integrally formed on the diaphragm 36 are ribs 40 which prevent excessive wear of the diaphragm. Since the actuating drive 4 or the actuator 16 must execute a relatively large travel over several centimeters, the membrane 36 rolls over a relatively long region on the housing inner wall, giving rise to sliding friction which can lead, after a relatively long operating time of a smooth diaphragm, to the latter becoming leaky owing to material wear. Owing to the ribs 40, which in no way themselves prevent the rolling movement, the present embodiment results only in a rectilinear contact, and in addition the diaphragm material is reinforced at the critical points, so that the lifetime of the membrane is lengthened.

Shape-position coding serves the purpose of uniquely specifying the position of the diaphragm 36 and of the actuator 16 connected to it—which is important with regard to the aim, described with reference to FIG. 2, of a flat surface. Formed on the edge of the membrane is a cover plate having a recess 41, which serves to accommodate a nose 42 formed correspondingly in the lower housing part 7u. It is possible to provide between the shaft attachment 38 and the actuator 16 a detachable plug-in connection, for example with clip connection or bayonet connection, which permits a simple exchange of the actuator 16. However, said connection must likewise be rotationally locked with respect to the longitudinal axis of the actuator. In this way, actuators specific to the type of vehicle—the top side of whose free ends can be subject to different slope requirements depending on the body contour—can be held in store like the upper part 18 and installed as required in the standardized actuating drive 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. In an actuating device for installation in a body of a motor vehicle, comprising:
   a housing with an exit opening having an edge;
   a retractable and extendable actuator guided in the housing so as to penetrate the exit opening;
   mounting means for attaching the housing to the body, the exit opening of the attached housing supporting the edge at a body edge of a body opening which is likewise penetrated by the actuator; and
   wherein said mounting means includes means for guidably supporting said housing on one side at least indirectly so as to be displaceable with respect to said mounting device along a displacement axis in a direction of movement of said actuator; and
   means for clamping an outer contour projecting from said housing on another side of the edge against an inner side of the body opening.

2. In an actuating drive according to claim 1, wherein said means for guidably supporting said housing provides a rotationally locked guidance of the housing in the mounting means via a slot, extending parallel to the displacement axis of the housing and an attachment of the housing, said attachment being insertable into the slot of the mounting means and being slidably displaced therein at least for a limited travel,
   and wherein the clamping means includes a self-locking construction which is provided with a rotatably mounted adjusting ring.

3. In an actuating drive according to claim 2, wherein the adjusting ring is rotatably and displaceably mounted to be arranged between the mounting means and the housing so that said adjusting ring is capable of rotating about the displacement axis of the housing and of being displaced along the same axis at least by a limited travel,
   wherein the housing is supported indirectly on the mounting means on one side via the adjusting ring,
   wherein at least one pair of complementary helices one on top of another on the adjusting ring, on the one hand, and on the mounting means, on the other hand are provided which slide on one another during rotation of the adjusting ring
   wherein the limited travel corresponds to at least the maximum height of rise of the helices, and
   wherein the sliding on one another of the complementary helices causes the displacement of the housing and of the adjusting ring with respect to the mounting means in the direction dependent on the senses of rotation of the adjusting ring.

4. In an actuating drive according to claim 2, wherein external teeth are integrally formed on the adjusting ring of the clamping means,
   wherein a locking lever is integrally formed in one piece on the mounting means and has at least one tooth complementary to the external teeth, which at least one tooth engages in said teeth over the entire limited travel of the adjusting ring, and can be disengaged from the external teeth by bending the locking lever by hand, the external teeth of the adjusting ring embodying together with the complementary tooth a self-locking mechanism of the clamping means.

5. In an actuating drive according to claim 3, wherein a clip arrangement is provided for fixing the adjusting ring of the clamping means and the housing to the mounting means which permits the limited travel along the displacement axis.

6. In an actuating drive according to claim 1, wherein a removable upper part is provided which contains the exit opening and can be removed from the housing, and wherein conical shaping of the outer contour of the edge of the exit opening is provided.

7. In an actuating drive according to claim 6, wherein clip hooks are integrally formed in one piece on the upper part, and wherein recesses are formed in an upper housing part, into which the clip hooks can be inserted with temporary elastic deformation for the purpose of loosely locking the upper part with respect to the housing, the upper part being guided rotationally locked in the housing by the inserted clip hooks.

8. In an actuating drive according to claim 6, wherein the actuator has a free end with a top side which in the retracted rest position of the actuator terminates at least approximately flush with the contour of the body in the region of the opening, and further comprising a self-locking adjusting device for displacing the upper part in the direction of movement, which upper part is guided rotationally locked in the housing and is capable of being displaced by a limited travel, but without adjusting the actuator with respect to the housing, it being the case that by displacement of the upper part the total length of the housing can be varied and the relative position of the edge of the exit opening of the housing can be set with respect to the free end of the actuator.

9. In an actuating drive according to claim 8, wherein a shape-position coding between the upper part and the housing is provided which permits attachment of the upper part to the housing only in a specific unique relative position.

10. In an actuating drive according to claim 8, wherein an adjusting ring of the adjusting device is provided which is mounted on the housing and is capable of being rotated about the movement axis of the actuator but not of being displaced, with at least one pair of complementary helices one on top of another on the adjusting ring, on the one hand, and on the upper part, on the other hand, which slide on one another during rotation of the adjusting ring, it being the case that the sliding on one another of the complementary helices causes the displacement of the upper part with respect to the housing in the direction dependent on the sense of rotation of the adjusting ring.

11. In an actuating drive according to claim 10, wherein in the adjusting ring of the adjusting device comprises a faceplate body, constructed in one piece, with a central hole, on which faceplate the helices are integrally formed in one piece and which is arranged in a plane between the upper part and the housing, and wherein the adjusting ring of the adjusting device is attached to the upper housing part by means of the clip hooks which penetrate the faceplate body of the upper part.

12. In an actuating drive according to claim 10, wherein external teeth are provided on the adjusting ring of the adjusting device, a locking lever integrally formed in one piece on the housing, of the adjusting device having at least one tooth, complementary to the external teeth of the adjusting ring which engages in said teeth over the entire limited travel of the adjusting ring, and can be disengaged from the external teeth by bending the locking lever by hand.

13. In an actuating drive according the claim 12, wherein an outer ring of the adjusting ring is provided whose outside diameter corresponds to the enveloping circle of the external teeth of the adjusting ring of the adjusting device, and which can be gripped from behind by the complementary tooth of the locking lever, which engages with the external teeth, as a result of which the adjusting ring of the adjusting device can be safeguarded against axial displacement even with the upper part removed.

14. In an actuating drive according to claim 11, wherein a shape-position coding is provided between the upper part and the adjusting ring, which shape position coding permits attachment of the upper part to the housing only in a specific unique relative position with respect to the adjusting ring, and simultaneously limits the possible angle of rotation of the adjusting ring with respect to the upper part.

15. In an actuating drive according to claim 1, wherein a roller diaphragm of a bistable diaphragm piston is connected to the actuator, which roller diaphragm is clamped all round the edge between an upper housing part and a lower housing part and provided with ribs extending over its circumference, and wherein a pneumatic dual-pressure connection is arranged in a wall of the lower housing part.

16. In an actuating drive according to claim 15, wherein a detachable connection is provided between the actuator and the diaphragm piston, especially a clip connection or bayonet connection.

17. In an actuating drive according to claim 8, wherein a roller diaphragm of a bistable diaphragm piston is connected to the actuator, which roller diaphragm is clamped all round the edge between an upper housing part and a lower housing part and provided with ribs extending over its circumference, and wherein a pneumatic dual-pressure connection is arranged in a wall of the lower housing part.

18. In an actuating drive according to claim 17, wherein a detachable connection is provided between the actuator and the diaphragm piston, especially a clip connection or bayonet connection.

* * * * *